US005215261A

United States Patent [19]

Frene

[11] Patent Number: 5,215,261

[45] Date of Patent: Jun. 1, 1993

[54] ELECTROSTATIC SPRAYER INSTALLATION FOR POWDER COATING PRODUCT

[75] Inventor: André Frene, Vourey, France

[73] Assignee: Sames S.A., Meylan, France

[21] Appl. No.: 899,284

[22] Filed: Jun. 16, 1992

[30] Foreign Application Priority Data

Jun. 24, 1991 [FR] France ............................... 91 07713

[51] Int. Cl.[5] ........................ B05B 15/02; B65G 53/06

[52] U.S. Cl. .................................... 239/704; 239/112; 239/305; 239/654; 239/600; 406/38; 406/113; 406/153

[58] Field of Search .............................. 137/892, 597; 222/144.5; 239/302-305, 307, 654, 655, 690, 695, 704, 705, 707, 340, 341, 390, 600, 104, 112; 406/1, 10, 38, 113, 118, 141, 140, 151, 155, 153

[56] References Cited

U.S. PATENT DOCUMENTS

| | | | |
|---|---|---|---|
| 1,935,977 | 11/1933 | Geer | 239/303 |
| 3,034,685 | 5/1962 | Breitenstein | 222/144.5 X |
| 3,667,674 | 6/1972 | Parsons et al. | 239/15 |
| 3,674,207 | 7/1972 | Carbonetti | 239/305 X |
| 3,782,632 | 1/1974 | Braun et al. | 239/305 X |
| 3,896,998 | 7/1975 | Vertue | 239/654 X |
| 4,475,819 | 10/1984 | Balmer | 239/654 X |
| 4,673,006 | 6/1987 | Speck | 137/882 X |
| 4,793,742 | 12/1988 | Strand | 239/655 X |

FOREIGN PATENT DOCUMENTS 1068021 5/1967 United Kingdom .

*Primary Examiner*—Andres Kashnikow
*Assistant Examiner*—Kevin P. Weldon
*Attorney, Agent, or Firm*—Spensley Horn Jubas & Lubitz

[57] ABSTRACT

An electrostatic sprayer installation for powder coating product comprises a plurality of powder sprayers and a plurality of powder storage tanks each adapted to contain powder of a specific color. Connecting ends of a plurality of suction tubes for each storage tank are disposed side by side on a connecting socket of the storage tank. A connecting block is provided with powder suction devices each establishing communication between a hose connected to a sprayer or a group of sprayers and one of the suction tubes. The connecting block is removable so that it can be mounted on the connecting socket of a selected storage tank. An air blower station has a connecting socket analogous to that of a storage tank and comprises air ejector orifices disposed to be connected to the suction devices.

5 Claims, 3 Drawing Sheets

ELECTROSTATIC SPRAYER INSTALLATION FOR POWDER COATING PRODUCT

BACKGROUND OF THE INVENTION

1. Field of the Invention

The invention concerns an electrostatic sprayer installation for powder coating product, including thermohardenable powder paint, and is more particularly concerned with an improvement enabling relatively simple and fast color changing.

2. Description of the Prior Art

A powder coating product installation usually includes a booth in which objects to be coated move past a plurality of powder sprayers. Depending on the size and the complexity of the objects, it may be necessary to use a relatively large number of electrostatic powder sprayers, around 20 per booth, for example. These sprayers must therefore be connected to a common source or tank of powder. If the installation is designed to allow color changing at greater or lesser intervals, it is therefore necessary on each color change to clean the booth, the sprayers and all the pipes feeding the sprayers before connecting them to a new source or tank of powder of a different color.

The invention makes it possible to simplify these operations and to reduce the down time at each color change by allowing simple, effective, fast and simultaneous cleaning of all the sprayers and their powder feed circuits.

SUMMARY OF THE INVENTION

The present invention consists in an electrostatic sprayer installation for powder coating product comprising a plurality of powder sprayers and a plurality of powder storage tanks each adapted to contain powder of a specific color, a plurality of suction tubes for each storage tank, a connecting socket of said storage tank on which connecting ends of said tubes are disposed side by side, a connecting block provided with powder suction devices each adapted to establish communication between a hose connected to a sprayer or a group of sprayers and one of said suction tubes, said connecting block being removable so that it can be mounted on the connecting socket of a selected storage tank, and an air blower station having a connecting socket analogous to that of a storage tank and comprising air ejector orifices disposed to be connected to said suction devices.

To change color the connecting block connected to one of the storage tanks is quickly detached and connected to the blower station where compressed air is injected into all the powder feed pipes of all the sprayers simultaneously. After blowing, the connecting block is mounted to the connecting socket of another storage tank containing the new color powder.

To facilitate these operations the connecting block is advantageously provided with handles enabling it to be moved from one connecting socket to another and is preferably attached by slings or the like to a load balancing system.

The invention will be better understood and other advantages of the invention will emerge more clearly from the following description of one installation in accordance with the invention given by way of example only and with reference to the appended drawings.

DETAILED DESCRIPTION OF THE INVENTION

Figure 1:
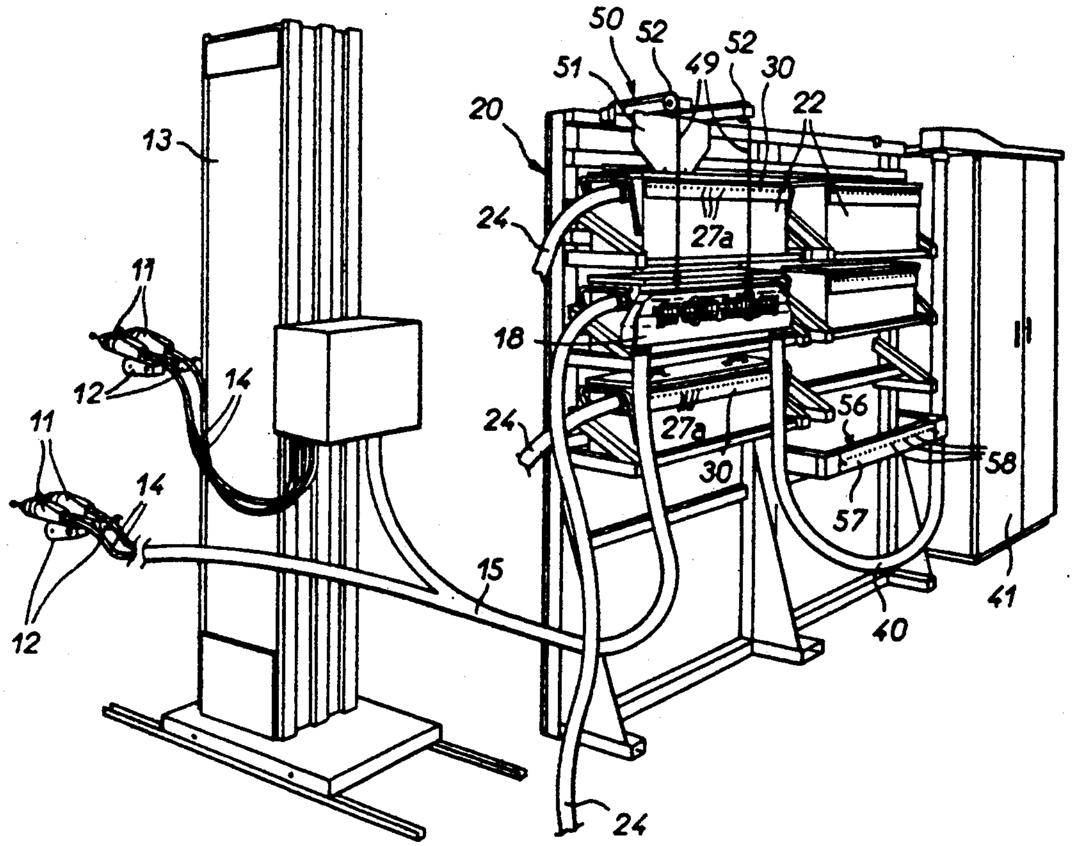
FIG. 1 is a diagrammatic perspective view of the installation.
Figure 2:
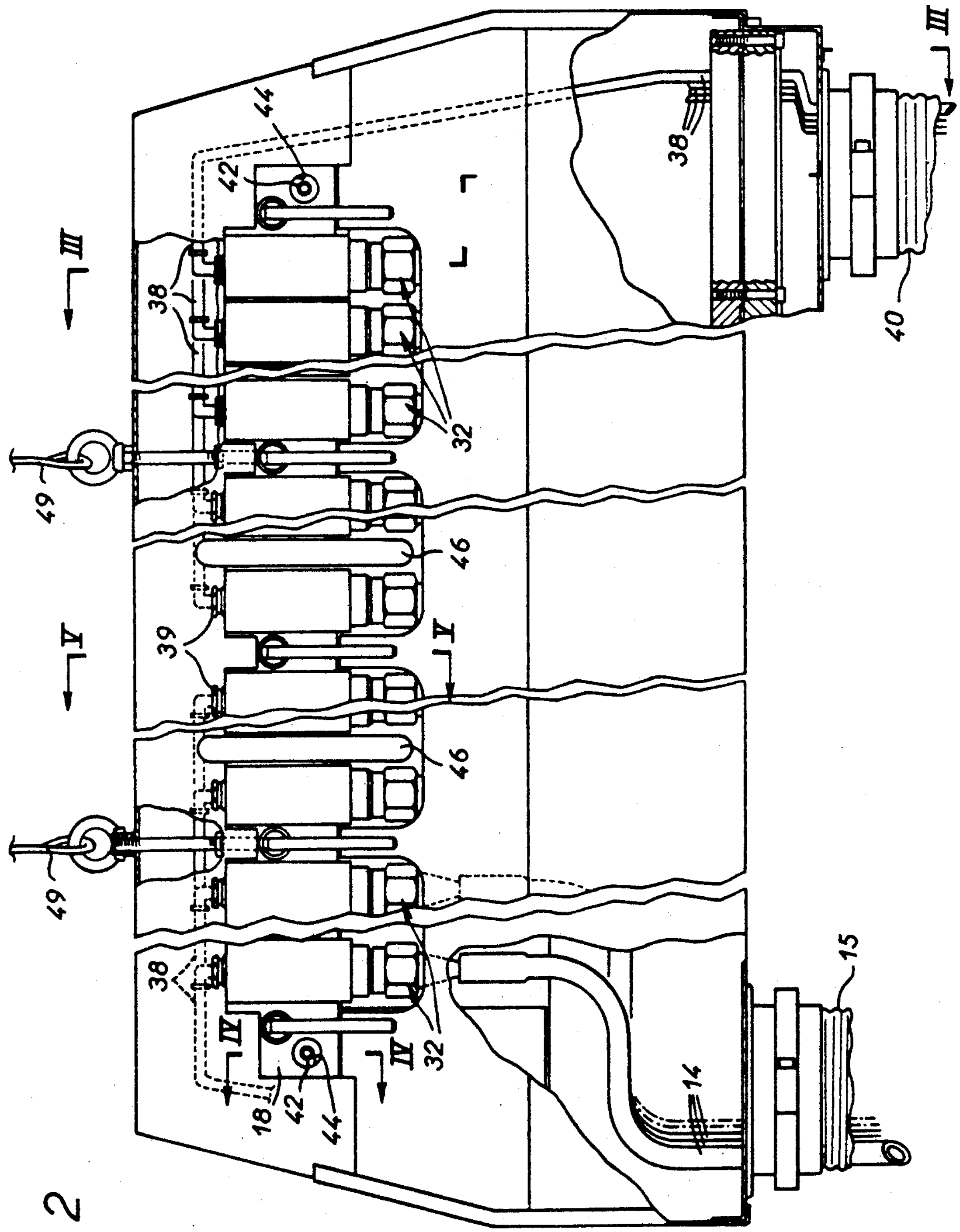
FIG. 2 is a detailed view showing the connecting block from in front.
Figure 3:
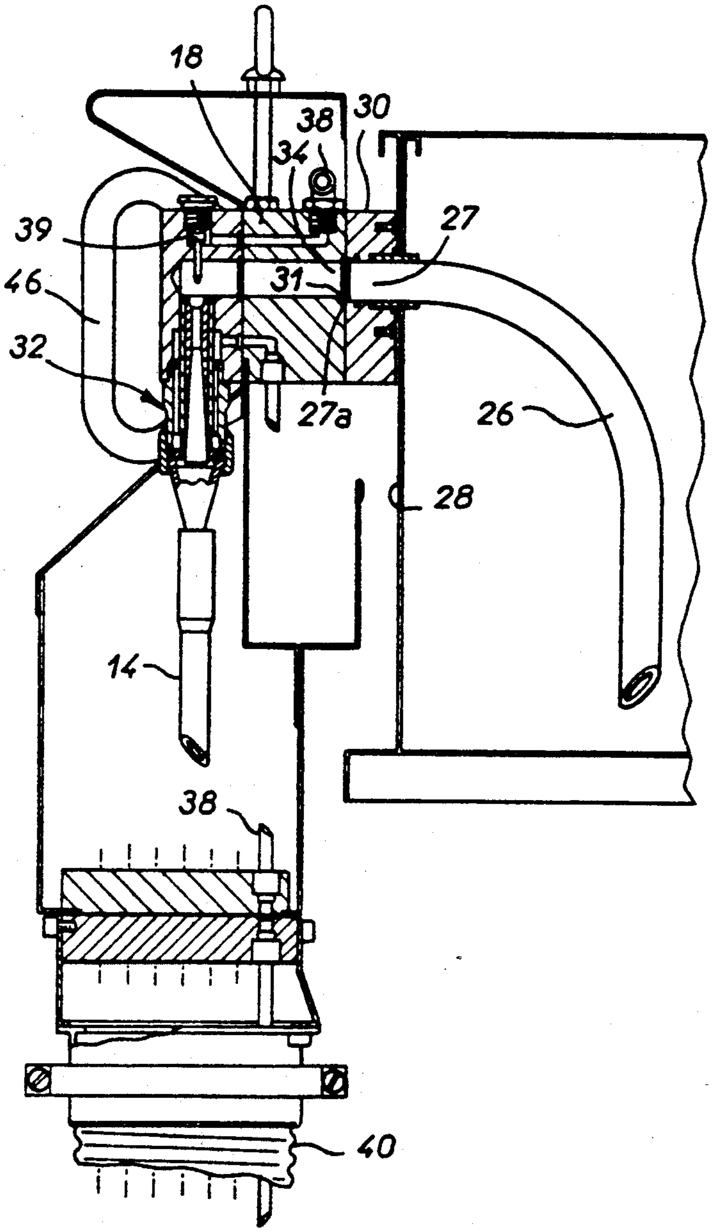
FIG. 3 is a view in cross-section on the line III—III in FIG. 2 showing the connecting block mounted on the connecting socket of a powder storage tank which is also shown schematically in cross-section.
Figure 4:
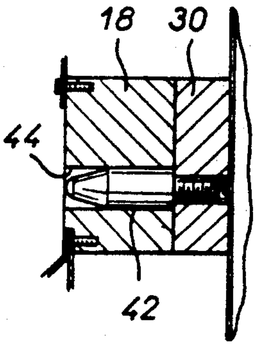
FIG. 4 is a cross-section on the line IV—IV in FIG. 2.
Figure 5:
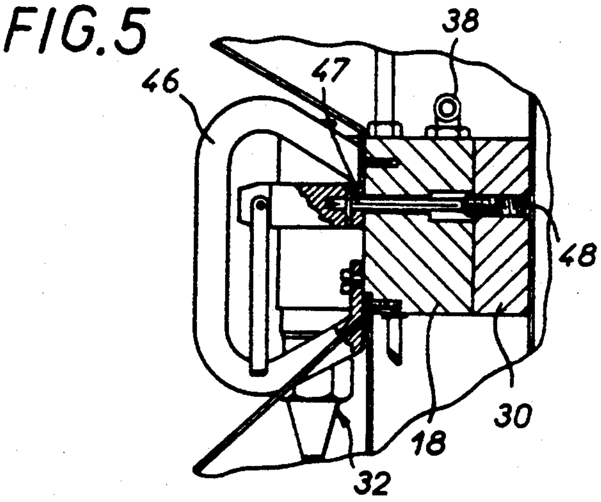
FIG. 5 is a cross-section on the line IV—IV in FIG. 2.

The installation shown in the drawings comprises a plurality of electrostatic powder sprayers 11 installed on mobile assemblies 12 moving vertically on support columns 13. These supports are installed in a booth that is not shown. A booth can accommodate a relatively large number of sprayers, around 20, depending on the size and the complexity of the objects to be coated. Each sprayer (or each group of a small number of sprayers) is supplied with powder by a hose 14. All these hoses are grouped together in a sheath 15 and connected to a connecting block 18 which will be described in more detail later.

The installation further comprises a rack 20 in the immediate vicinity of the booth on which are installed a plurality of powder storage tanks 22. Each storage tank is in the shape of a rectangular parallelpiped and contains powder of a specific color and is connected to powder feed means (not shown) by a hose 24 so that it can be replenished with powder. Each storage tank 22 encloses a plurality of suction tubes 26 (typically around 20 such tubes) disposed side by side and dipping into the powder. The powder is normally kept in a fluidized state by injecting air into the storage tank. Connecting ends 27 of the tubes extend through the front wall 28 of the storage tank and are disposed side by side on a connecting socket 30 fixed to the front wall and adapted to receive the connecting block 18. These connecting ends 27 have respective orifices **27*a* flush with the surface of the connecting socket 30**.

The connecting block 18 is provided with powder suction devices 32 each establishing communication between one hose 14 and a suction tube 26. The suction devices 32 are installed side by side on the connecting block. To be more precise, the inlet 34 of a suction device of this kind is a passage formed in the connecting block 18 and placed in front of the respective orifice **27*a*. 0-ring seals 31 accommodated in annular grooves provided on the surface of the connecting block around the inlets 34 provide a sealed coupling between the suction tubes 26 and the suction devices 32. The latter are conventional venturi devices supplied with compressed air by respective distribution hoses 38 and individual injectors 39. The hoses 38 are grouped together in a common sheath 40 connected to a cabinet 41 housing a set of control valves and pressure regulator means whereby the air feed to each of the suction devices can be adjusted independently. The outlet of each suction device is connected to a hose 14**.

The connecting block 18 is removable and mobile. It can therefore be mounted to the connecting socket 30 of any chosen storage tank. To this end each connecting socket is provided with two locating members 42 projecting from its surface and the connecting block has two corresponding holes 44. The connecting block is also provided with handles 46 for moving it from one connecting socket to another. It is also provided with quick-action fixing screws 47 adapted to cooperate with screwthreaded holes 48 in the sockets. Finally, the connecting block is attached by slings 49 or the like to a load balancing system 50. This system, part of which can be seen in FIG. 1, includes a carriage 51 movable horizontally on the upper part of the rack and provided with two pulley wheels 52 around which the slings 49 are wrapped, the slings being connected to a counterweight system (not shown in the drawing) or any equivalent balancing arrangement.

Finally, the rack 20 supports an air blower station 56 provided with a connecting socket 57 analogous to that on a storage tank and comprising air ejector orifices 58 disposed to be coupled to the venturi suction devices. In other words, the inlet of each suction device faces an air ejector orifice 58 when the connecting block is mounted to the connecting socket 57 of the air blower station 56. The latter is connected to a compressed air supply (not shown) accommodated in the cabinet 41, for example.

Operation is extremely simple and obvious from the foregoing description. To change powder spraying is stopped and the connecting block is detached from the storage tank on which it is mounted. Said connecting block is then placed on the air blower station 56 so that all the suction devices are simultaneously connected to the compressed air supply. All the hoses conveying the powder, the connecting block and the sprayers are therefore all blown clean rapidly and simultaneously. After cleaning the booth, it remains only to move the connecting block 18 in front of another storage tank 22 containing a different color powder and to connect said connecting block to the socket of that storage tank. The installation is then ready to be used again.

I claim:

1. Electrostatic sprayer installation for powder coating product comprising a plurality of powder sprayers and a plurality of powder storage tanks each adapted to contain powder of a specific color, a plurality of suction tubes for each storage tank, a connecting socket of said storage tank on which connecting ends of said tubes are disposed side by side, a connecting block provided with powder suction devices each adapted to establish communication between a hose connected to at least one sprayer and one of said suction tubes, said connecting block being removable so that it can be mounted on the connecting socket of a selected storage tank, and an air blower station having a connecting socket similar to said connecting socket of one of said storage tanks and comprising air ejector orifices disposed to be connected to said suction devices.

2. Sprayer installation according to claim 1 wherein said connecting block comprises handles for moving it from one connecting socket to another.

3. Sprayer installation according to claim 1 wherein said connecting block is adapted to be connected to a load balancing system.

4. Sprayer installation according to claim 2 wherein each connecting socket comprises locating means projecting from its surface and said connecting block comprises corresponding holes.

5. Sprayer installation according to claim 3 wherein said connecting block incorporates fixing screws adapted to cooperate with screwthreaded holes formed in said connecting sockets.

* * * * *